Jan. 16, 1962 W. E. KNAPP ETAL 3,016,958
HARROWS
Filed June 30, 1958 2 Sheets-Sheet 1

INVENTORS.
WILLIAM E. KNAPP
WILLIAM V. LOHRMAN
BY
ATTORNEYS

Jan. 16, 1962  W. E. KNAPP ET AL  3,016,958
HARROWS
Filed June 30, 1958  2 Sheets-Sheet 2
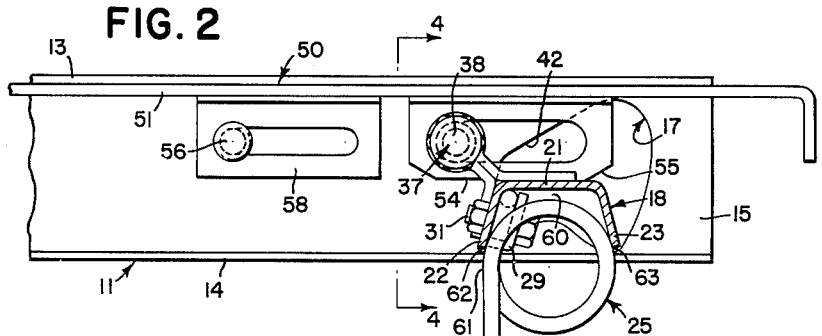
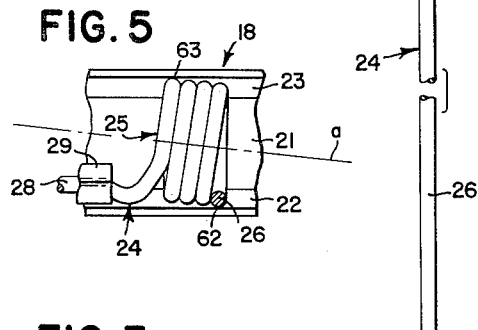
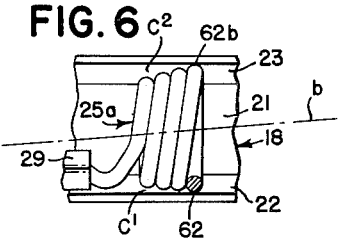
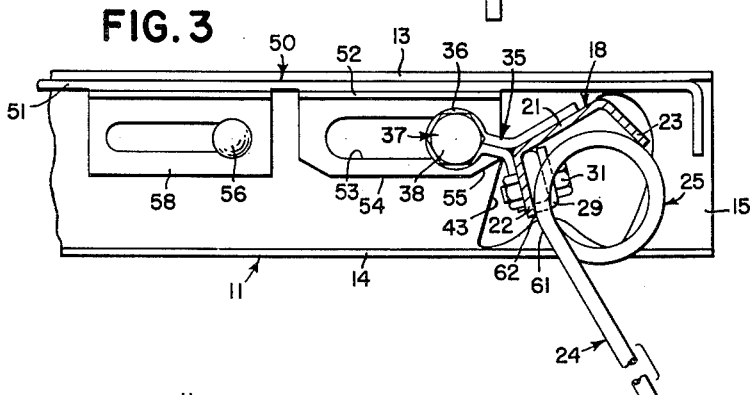
INVENTORS.
WILLIAM E. KNAPP
WILLIAM V. LOHRMAN
BY
ATTORNEYS

United States Patent Office 3,016,958
Patented Jan. 16, 1962

3,016,958
HARROWS
William E. Knapp, Moline, Ill., and William V. Lohrman, Davenport, Iowa, assignors, by mesne assignments, to Deere & Company, a corporation of Delaware
Filed June 30, 1958, Ser. No. 745,571
5 Claims. (Cl. 172—639)

The present invention relates generally to agricultural implements and more particularly to ground working tools of the harrow type.

The object and general nature of the present invention is the provision of a cultivating implement in the form of a spring or flexible tooth harrow with new and improved means for swingably connecting the flexible spring teeth with the harrow frame structure and means for selectively locking the teeth in the desired position. For example, it is sometimes desirable to operate the harrow with the teeth in the generally vertical position, as when increased penetration is desired, and at other times it may be desirable to have the teeth extend downwardly and rearwardly, as when operating under trashy conditions. In certain prior art structure with which I am familiar, the harrows have been made so that the teeth are freely swingable between the vertical position and the downwardly angled position, somewhat along the lines of the Whiteside Patent 163,428, issued May 18, 1875, but an inherent feature of this type of harrow is the necessity to provide for changing the application of the draft from front to rear, or vice versa, depending upon whether it is desired to have the teeth held in their vertical position or in their angled position.

The principal object of this invention is the provision of means whereby, without the disadvantages of having to reverse the application of draft to the harrow, the teeth may be locked or rigidly held in a vertical position when desired, and by merely releasing the locking means, the teeth may be permitted to swing backwardly into an angled position whenever soil or other operating conditions require an angled position of the harrow teeth.

Another important feature of this invention is a tooth mounting means for coil spring teeth that provides a frictional snubbing action that reduces the rebound after a tooth or tine clears an obstruction, and hence tooth breakage is substantially eliminated. More specifically, a further feature of this invention is the provision of a coil spring tooth arrangement for harrows, wherein the coils are so constructed and arranged as to be resiliently held in frictional contact with the associated supporting tooth bars only at the sides of the coil, whereby the aforesaid frictional snubbing action is always available.

These and other objects and advantages of the present invention will be apparent to those skilled in the art after a consideration of the following detailed description, taken in conjunction with the accompanying drawings, in which:

FIG. 2 is a sectional view taken generally along the line 2—2 of FIG. 1, showing the locking means holding the harrow teeth in their vertical position.

FIG. 3 is a view similar to FIG. 2, showing the locking means in the position accommodating rearward swinging of the tooth bars to provide for angling the harrow teeth.

FIG. 4 is a section taken along the line 4—4 of FIG. 2.

FIG. 5 is a fragmentary view taken generally along the line 5—5 of FIG. 1, showing one way in which the spring coils may be disposed to secure the desired frictional snubbing action that limits tooth rebound.

FIG. 6 is a view similar to FIG. 5 showing a modified spring tooth construction.

Figure 1:
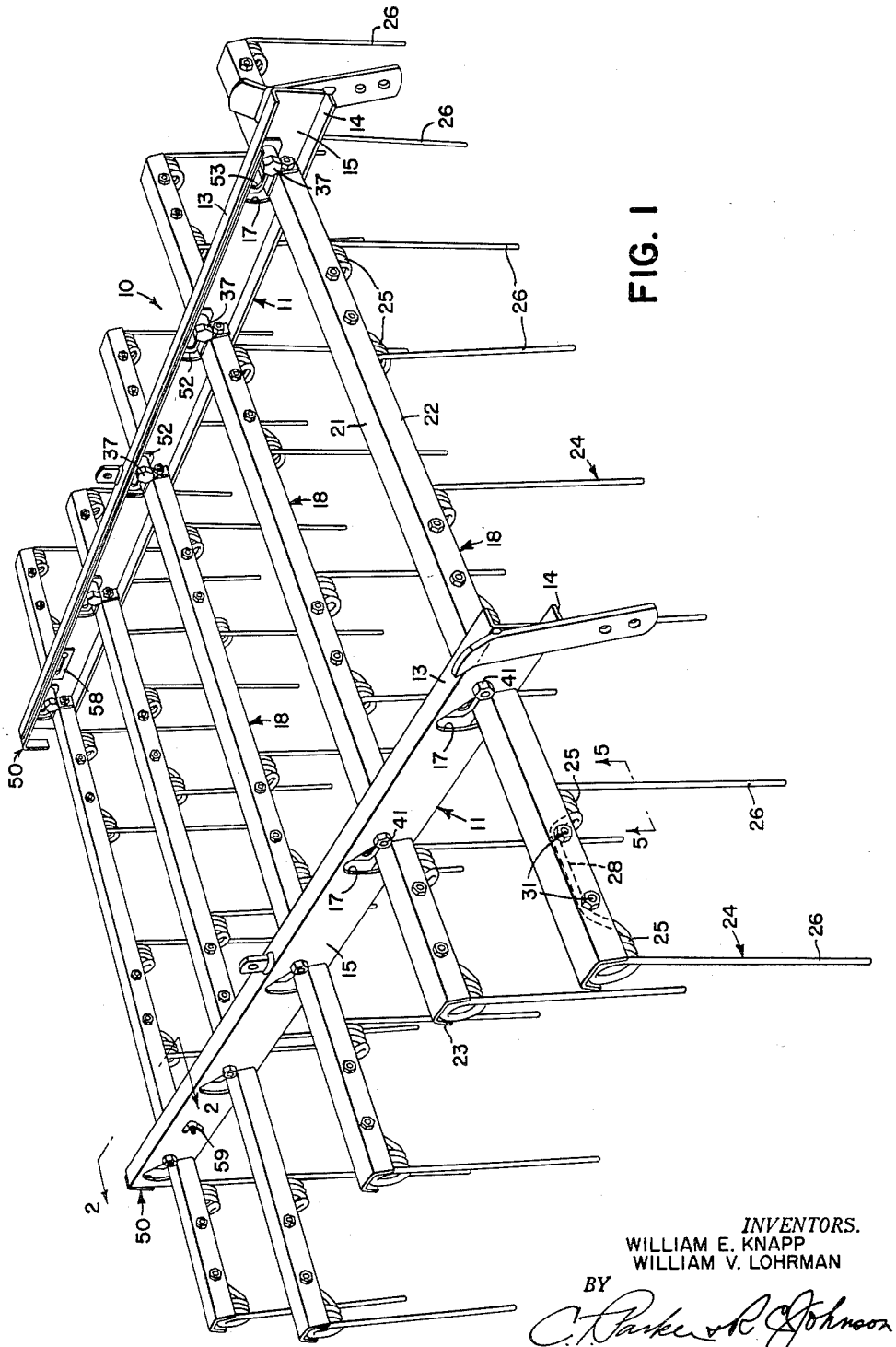
FIG. 1 is a perspective view of a flexible spring tooth harrow in which the principles of the present invention have been incorporated.

Referring first to FIG. 1, the frame of the harrow is indicated in its entirety by the reference numeral 10 and comprises a pair of longitudinally extending beam members 11 that preferably are in the form of channels disposed in a vertical position, with upper and lower flanges 13 and 14 disposed horizontally and extending laterally inwardly. The web sections 15 of the channels 11 are apertured, as indicated at 17, to receive a plurality of tooth bars 18. Each of the bars 18 is formed with a flat or web portion 21 and downwardly and outwardly extending front and rear flanges 22 and 23. The several tooth bars 18 extend through the openings 17 in the beam members, and each tooth bar 18 carries a plurality of spring tooth members 24. Each of these members comprises a pair of coiled sections 25 the laterally outer ends of which terminate in soil working tines 26. The inner ends of the coil sections 25 are interconnected by a transverse portion 28 that is shaped to fit flat against the front flange 22 of the associated tooth bar 18 and receive a clamp member 29. The latter is apertured to receive a pair of bolts 31 that serve as fastening means for clamping each tooth member 24 in position to the forward tooth bar flange 22.

Each tooth bar 18 is pivotally connected to the associated channel beams 11 so as to rock or swing relative thereto about an axis that lies forwardly of the openings 17 through which the tooth bar extends. For this purpose, we provide for each tooth bar 18 a pair of apertured lugs 35 welded to the forward flange 22 and to the upper or flat portion 21 of each tooth bar 18 so as to extend generally forwardly and upwardly, terminating in an apertured portion 36 through which a pivot stud 37 extends. Each pivot stud 37 is made up of a bolt 38 that extends through a bushing 39 and through an opening in the web of the associated beam 11. The bolt 38 is provided with a nut 41 that, when tightened, effectively secures the bolt and the bushing 39 in place rigidly with respect to the associated beam 11.

As will be seen from FIGS. 2 and 3 the tooth bars 18 extend through the openings 17 so that each tooth bar is freely swingable on the pivots 37 between limits defined by the upper and lower edges 42 and 43 of the openings 17. It will also be seen from FIG. 3 that the flat upper face of the web 21 abuts against the straight edge 42 at the upper portion of each opening 17, such edge 42 constituting a stop determining the angled position of the associated tooth bar 18. The other position is determined by the similar flat or straight edge portion 43 against which the outer face of the front flange 22 is adapted to abut, the tine portions 26 being in a substantially vertical position in said other position.

According to this invention, means is provided for locking the tooth bars so as to hold the tines 26 in their vertical position. The means to this end comprises a locking bar 50 carried by each beam member 11. Each locking bar comprises an elongated strap member 51 and a plurality of slotted brackets 52 carried thereby. Each slotted bracket 52 and the slot 53 therein are dimensioned so as to slidably engage and be supported on the bushings 39. The vertical dimension of the bracket 52 is such that when the locking bar 50 is shifted rearwardly or to the left as viewed in FIG. 1 and to the right as viewed in FIGS. 2 and 3, the lower edges 54 of the respective brackets 52 move into position over the flat upper faces 21 of the associated tooth bar 18 and lock the latter in lower positions with the flanges 22 against the straight edge sections 43 of the beam openings 17. Each bracket 52 is beveled at the rear corners, as indicated at 55 in FIG. 2. This facilitates movement of the locking members into locking position (FIG. 2). It will be seen, therefore, that whenever the locking bars 50 are shifted rearwardly from the position shown in FIG. 3 to the position shown in FIG. 2, the tooth bars are locked in a position holding the tines 26 vertical. The locking bars 50 may be secured in locking position by any suitable means, such as a bolt 56 that extends through the associated channel member 11 and through a slotted bracket 58 carried by the bar 50. The outer end of the bolt 56 carries a wing nut 59 that, when tightened, locks the bar 50 against movement relative to the associated beams 11.

The double tined spring teeth 24 and the channel-like tooth bars 18 are of particular construction and arranged so as to reduce or eliminate objectional vibration and breakage of the teeth. As will be seen from FIG. 2, the diameter of each of the coil portions 25 of the teeth is such that when the opposite side portions of the coils engage the inner faces of the divergent flanges 22 and 23 of the associated tooth bar 18, there is a substantial clearance 60 between the upper portion of each coil and the adjacent inner face of the channel web 21. Also, the spring members 24 are formed so that when the attachment sections 28 (FIG. 1) are bolted in place, the coil sections 25 are resiliently held in wedging relation between the flanges 22 and 23 as shown in FIGS. 2 and 3. It will be seen that each tine portion 26 extends generally downwardly from the associated coil portion 25 so as to be tangent to the coil at a point indicated generally at 61 that lies below the point of contact, indicated at 62, between the adjacent portion of the coil and the adjacent tooth bar flange 22.

When the tine 26 is deflected rearwardly, as by striking an obstruction, the coil portion adjacent the upper end of the tine section is momentarily shifted away from contact with the flange 22 and the tine end of the coil 25, and the tine itself, moves generally about the point of contact 63 between the rear portion of the coil, at the tine end thereof, and the rear flange 23. As soon as the obstruction is passed, the resiliency of the coil portion causes the coil 25 to move back into contact with the front flange 22, at 62, and then as the coil expands and the tine begins to move forwardly, the upper portion thereof rubs or slides against the inner face of the flange 22 whereby the latter serves as a damping means and materially reduces the rebounding action of the tooth. This frictional snubbing or damping action is augmented further by the inherent resiliency of the tooth member and its mounting tending to act at all times to keep the coils 25 wedged in between the divergent flanges and by the fact that the coils never bottom within the channel bars 18.

The above mentioned frictional snubbing or damping action that restrains and eliminates objectional rebounding of the tines 26 is an important feature of this invention, and one particular tooth formation by which this result is secured is shown by way of illustration in FIG. 5. The axially outer portion of each coil 25, there being only one shown in FIG. 5, that engages the flange 22 is the section against which most of the snubbing action is effective, because this is the portion of the coil that deflects the greatest amount when the tooth is flexed rearwardly, or to the right as viewed in FIG. 2. In order to ensure contact at this point, as indicated at 62 in FIG. 5, each of the coils 25 of the tooth member 24 is particularly formed and shaped so that the axis of the coil lies at a slight angle with respect to the adjacent axis of the channel-like tooth bar 18. This axis is indicated by the reference character $a$ in FIG. 5. By arranging and shaping the coil in this way, wedging contact with the flanges 22 and 23 is had at generally two diagonally opposite points as indicated at 62 and 63 in FIG. 5. To secure this particular coil configuration requires a separate and additional bending action, for in the normal or usual way of winding double coil teeth, the coil axes indicated at $b$ in FIG. 6 generally lie at an angle with respect to the axis of the channel bar that is opposite to the angle of the axis $a$ shown in FIG. 5.

In order to eliminate this extra bending operation in the manufacture of the coiled teeth, we propose to allow the coils to take the normal position, with the axes $b$ (FIG. 6) lying at an angle to the bar axis that, is directly opposite to the angle shown in FIG. 5. In order to assure contact between the outermost turn or tine end of the coil and the adjacent flange 22, as indicated at 62 in FIG. 6, the coil sections 25a (FIG. 6) are themselves made conical, which can be done without a separate bending operation, so that frictional snubbing contact between the coil section 25a is still had between the opposite sides of the coil, as shown at 62 and 62b in FIG. 6, with clearance $c^1$ between the inner portion of the coil 25a and the forward flange 22 and somewhat greater clearance $c^2$ between the inner end of the coil and the rear flange 23, and with even greater clearance between the top of the coil and the upper web 21 of the bar 18 than is indicated at 60 in FIG. 2.

While we have shown and described above the preferred structure in which the principles of the present invention have been incorporated, it is to be understood that our invention is not to be limited to the particular details, shown and described above, but, in fact, widely different means may be employed in the practice of the broader aspects of our invention.

What we claim, therefore, and desire to secure by Letters Patent is:

1. A flexible tooth harrow comprising a pair of longitudinal beams, each having a generally horizontal flange, a plurality of transverse tooth bars swingably connected with said beams and spaced from said flanges, ground working teeth carried by said bars, and means acting between said flanges and said tooth bars comprising a member slidable longitudinally of one of said beams and engaging the inner face of one of the flanges thereof and including means engageable with the associated tooth bar for locking said tooth bars against swinging movement.

2. A flexible tooth harrow comprising a pair of longitudinal beams each having a generally horizontal flange, a plurality of transverse tooth bars swingably connected with said beams and spaced from said flanges, ground working teeth carried by said bars, a slide movably mounted on each beam between the flange thereof and said tooth bar, and portions on each slide adapted to be disposed between the associated flange and said tooth bars for limiting swinging movement thereof.

3. A flexible tooth harrow comprising a pair of longitudinal beams, a plurality of tooth bars disposed transversely of said beams, generally downwardly extending ground engaging teeth carried by said tooth bars, a plurality of pivot members, one for each tooth bar, carried by each beam, means connecting said tooth bars with said pivot members, a locking bar movable longitudinally of each beam and having slotted portions slidably mounted on said pivot members, and abutment means on each locking bar engageable with said tooth bars for locking the latter against rocking relative to said beams.

4. A flexible tooth harrow comprising a pair of longitudinal beams having a plurality of pairs of openings, one opening of each pair being larger than the other opening and constituting a tooth bar receiving opening, the other opening of said pair being a pivot receiving opening, a plurality of transverse tooth bars extending through said bar-receiving openings, the latter being larger than said bars whereby the tooth bars are movable therein about an axis passing through the adjacent pivot-receiving opening, apertured brackets fixed to said bars adjacent said beams and extending outwardly of the bars to points bringing the apertures thereof into registry with the associated pivot-receiving openings, respectively, pivot studs carried by the pivot-receiving openings of said beams and receiving the apertured portions of said brackets, whereby the tooth bars are connected for swinging movement to said beams about the axis of said stud, lock means carried by certain of said pivot studs and movable relative thereto into a position engaging said bars so as to hold them against swinging relative to said beams.

5. A flexible tooth harrow comprising a pair of longitudinal beams, a plurality of tooth bars disposed transversely of said beams, generally downwardly extending ground engaging teeth carried by said tooth bars, a plurality of pivot members, one for each tooth bar, carried by each beam, means connecting said tooth bars with said pivot members, a locking bar movable longitudinally of each beam, means slidably supporting said locking bar on the associated beam, and abutment means on each locking bar engageable with said tooth bars for locking the latter against rocking relative to said beams.

References Cited in the file of this patent

UNITED STATES PATENTS

| | | |
|---|---|---|
| Re. 10,041 | Stewart | Feb. 21, 1882 |
| 242,094 | Hubbell | May 24, 1881 |
| 1,128,283 | Barnard | Feb. 16, 1915 |
| 1,784,613 | Reynolds | Dec. 9, 1930 |
| 2,129,827 | Donovan | Sept. 13, 1938 |
| 2,524,937 | Smith | Oct. 10, 1950 |
| 2,688,909 | Waterstreet | Sept. 14, 1954 |
| 2,737,005 | Archer | Mar. 6, 1956 |
| 2,826,027 | Melroe | Mar. 11, 1958 |

FOREIGN PATENTS

| | | |
|---|---|---|
| 706,156 | France | Mar. 24, 1931 |